United States Patent
Yang et al.

(10) Patent No.: US 11,060,444 B2
(45) Date of Patent: Jul. 13, 2021

(54) CONDENSATE DISCHARGE DEVICE OF INTERCOOLER FOR VEHICLE

(71) Applicants: Hyundai Motor Company, Seoul (KR); Kia Motors Corporation, Seoul (KR)

(72) Inventors: Il Suk Yang, Gyeonggi-do (KR); Jung Joo Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/679,550

(22) Filed: Nov. 11, 2019

(65) Prior Publication Data
US 2020/0370466 A1    Nov. 26, 2020

(30) Foreign Application Priority Data
May 20, 2019   (KR) .................. 10-2019-0058488

(51) Int. Cl.
*F02B 29/04*    (2006.01)
*F28F 17/00*    (2006.01)

(52) U.S. Cl.
CPC ...... *F02B 29/0468* (2013.01); *F02B 29/0456* (2013.01); *F28F 17/005* (2013.01)

(58) Field of Classification Search
CPC combination set(s) only.
See application file for complete search history.

(56) References Cited

U.S. PATENT DOCUMENTS

2013/0019845 A1 * 1/2013 Meyer ................. F02B 29/0468
                                                          123/542
2016/0281650 A1 * 9/2016 Roth ...................... F02M 26/35

FOREIGN PATENT DOCUMENTS

DE     102017004649 A1 * 11/2018 ............. F02M 26/17
KR        20170123017 A    11/2017

* cited by examiner

*Primary Examiner* — Jesse S Bogue
*Assistant Examiner* — Loren C Edwards
(74) *Attorney, Agent, or Firm* — Mintz Levin Cohn Ferris Glovsky and Popeo, P.C.; Peter F. Corless

(57) ABSTRACT

A condensate discharge device of an intercooler for a vehicle is provided to remove condensate collected inside an intercooler. The device includes an ejector hose that is disposed between an inlet tank and an outlet tank to form a flow path for an air flow between the inlet tank and the outlet tank. An ejector housing is disposed on one side of the outlet tank. The condensate collected in the outlet tank is introduced into the ejector housing. An ejector nozzle is disposed in the ejector housing and injects the air introduced from the ejector hose into an inner space of the outlet tank. When injecting the air, to inject the condensate, which is introduced from the outlet tank into the ejector housing, injecting the inner space of the outlet tank with the air.

14 Claims, 7 Drawing Sheets

CONDENSATE DISCHARGE DEVICE OF INTERCOOLER FOR VEHICLE

CROSS-REFERENCE TO RELATED APPLICATION

This application claims under 35 U.S.C. § 119(a) the benefit of priority to Korean Patent Application No. 10-2019-0058488 filed on May 20, 2019, the entire contents of which are incorporated herein by reference.

BACKGROUND

(a) Technical Field

The present disclosure relates to a condensate discharge device of an intercooler for a vehicle, and more particularly, to a condensate discharge device of an intercooler for a vehicle to remove condensate collected in an intercooler.

(b) Background Art

An engine of a vehicle uses a turbocharger to increase an intake amount. The engine to which the turbocharger is connected is referred to as a turbo intercooler engine. In the turbo intercooler engine, an intercooler is installed between a compressor of the turbocharger and an intake manifold of the engine. The intercooler increases a density of air by cooling air supplied to the intake manifold.

The air supercharged into the intercooler due to the turbocharger contains moisture in the atmosphere, and water in a blow-by gas and an exhaust recirculation gas. The moisture and the water which are introduced into the intercooler are cooled while passing through an interior of a core of the intercooler. When the moisture and the water are cooled in the core, the moisture and the water are condensed due to a temperature difference with respect to the outside of the core thus causing condensate to be generated.

The condensate is continuously collected and accumulated in an outlet tank which is disposed behind the core of the intercooler. When an engine load is drastically increased due to rapid acceleration or the like in a state in which an accumulated amount of the condensate collected in the outlet tank is equal to or greater than a predetermined amount, a substantial amount of condensate collected in the outlet tank may be introduced into the engine due to an increased amount of air supercharged into the intercooler. When the amount of condensate which is temporarily introduced into the engine exceeds a predetermined ratio to a volume of a combustion chamber of the engine, an engine failure occurs.

Further, when a flow speed of the air supercharged into the intercooler is equal to or greater than a predetermined speed, the condensate collected in the outlet tank of the intercooler may be introduced into sensors (e.g., a boost pressure sensor and the like) and may be frozen. In particular, malfunction of the sensors occurs. Additionally, an exhaust gas contains sulfur and chlorine components to have acidity. When an exhaust gas recirculation (EGR) device which recirculates the exhaust gas to an engine intake system is connected ahead of the intercooler, the condensate collected in a lower tank of the intercooler is acidified, and the intercooler and a component connected thereto are corroded due to the condensate.

The above information disclosed in this section is merely for enhancement of understanding of the background of the disclosure and therefore it may contain information that does not form the prior art that is already known in this country to a person of ordinary skill in the art.

SUMMARY

The present disclosure provides a condensate discharge device of an intercooler for a vehicle, which is capable of preventing problems which occur due to accumulation of a substantial amount of condensate in an outlet tank by frequently discharging the condensate collected in the outlet tank of an intercooler in small amounts.

In an exemplary embodiment, a condensate discharge device of an intercooler for a vehicle may include a cooler core disposed between an inlet tank and an outlet tank and configured to cool air introduced from the inlet tank and discharge the cooled air to the outlet tank, the condensate discharge device including an ejector hose disposed between the inlet tank and the outlet tank to form a flow path for an air flow between the inlet tank and the outlet tank; an ejector housing disposed on a first side of the outlet tank in a form that allows condensate collected in the outlet tank to be introduced into the ejector housing; and an ejector nozzle disposed in the ejector housing and configured to inject the air introduced from the ejector hose into an inner space of the outlet tank, and when injecting the air, configured to inject the condensate, which is introduced from the outlet tank into the ejector housing, into the inner space of the outlet tank with the air. The condensate discharge device has the following features.

The ejector housing may include a condensate inlet aperture for connecting an inner space of the ejector housing to the inner space of the outlet tank, and the condensate collected in the outlet tank may be introduced from the outlet tank into the ejector housing through the condensate inlet aperture. In particular, the ejector housing may include a nozzle insertion portion into which a rear end portion of the ejector nozzle may be inserted; a condensate injection portion disposed behind the nozzle insertion portion and configured to discharge the air injected from the ejector nozzle and the condensate introduced into the ejector housing to the inner space of the outlet tank; and a condensate inlet disposed on a rear end portion of the nozzle insertion portion and protruding outward the nozzle insertion portion. The condensate inlet aperture may be disposed on a front end portion of the condensate inlet.

Further, the condensate inlet may be disposed on a bottom portion of the outlet tank, a condensate collection portion in which the condensate is collected may be disposed on the bottom portion of the outlet tank, and the condensate collection portion may be disposed adjacent to the condensate inlet aperture.

An air injection portion configured to discharge the air toward the condensate injection portion may be disposed on the rear end portion of the ejector nozzle, and the air injection portion may be disposed in front of the condensate injection portion. The air injection portion and the condensate inlet may be disposed on a straight line (e.g. linearly). Further, the outlet tank may include a discharge portion connected to a front end portion of an intake manifold, and the discharge portion may be disposed behind the ejector housing based on a flow direction of the condensate discharged from the condensate injection portion of the ejector housing.

In addition, a flange may be disposed on an outer surface of the ejector nozzle, and, when the rear end portion of the ejector nozzle is inserted into the nozzle insertion portion of the ejector housing, the flange may guide an insertion position of the ejector nozzle by being hooked to the outer surface of the ejector housing. Further, an O-ring may be disposed on the outer surface of the ejector nozzle, and the O-ring may be brought into close contact with the outer surface of the ejector nozzle and an inner surface of the nozzle insertion portion to prevent the air from leaking between the outer surface of the ejector nozzle and the inner surface of the nozzle insertion portion.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

Figure 1:
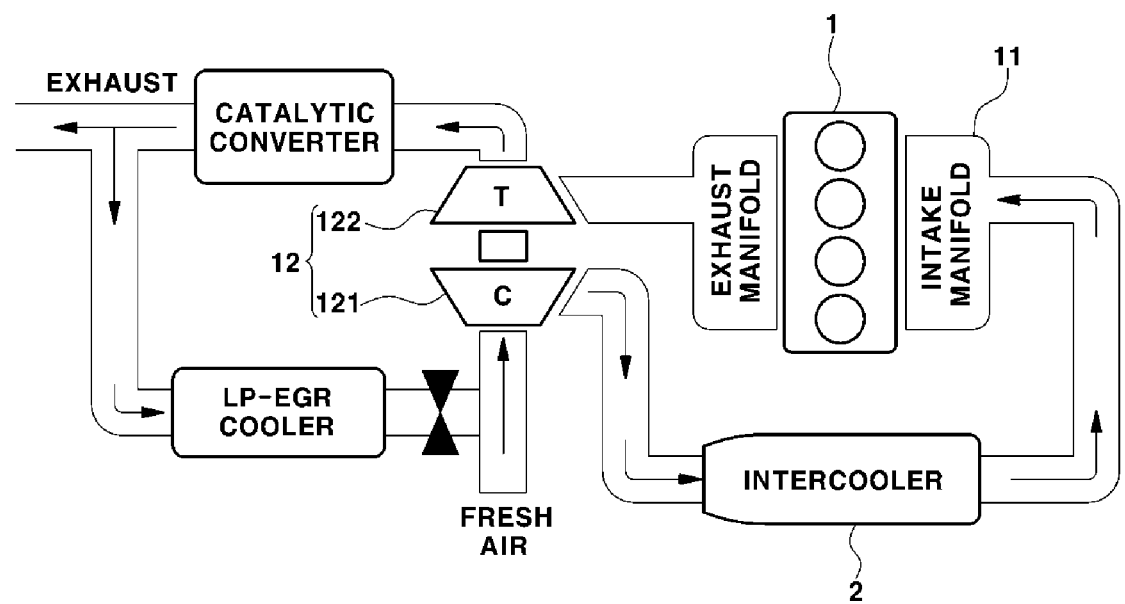
FIG. 1 is a diagram illustrating an engine system of a turbo intercooler vehicle according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, the present disclosure will be described to allow those skilled in the art to easily practice the present disclosure. As shown in FIG. 1, an intercooler 2 may be configured to cool high-temperature air which is compressed by a compressor 121 by being disposed behind the compressor 121 of a turbocharger 12. The turbocharger 12 may include a turbine 122 driven by an exhaust gas discharged from an engine 1. The air cooled by the intercooler 2 may be introduced into the engine 1 through an intake manifold 11 disposed behind the intercooler 2 based on a flow direction of the air.

Figure 2A:
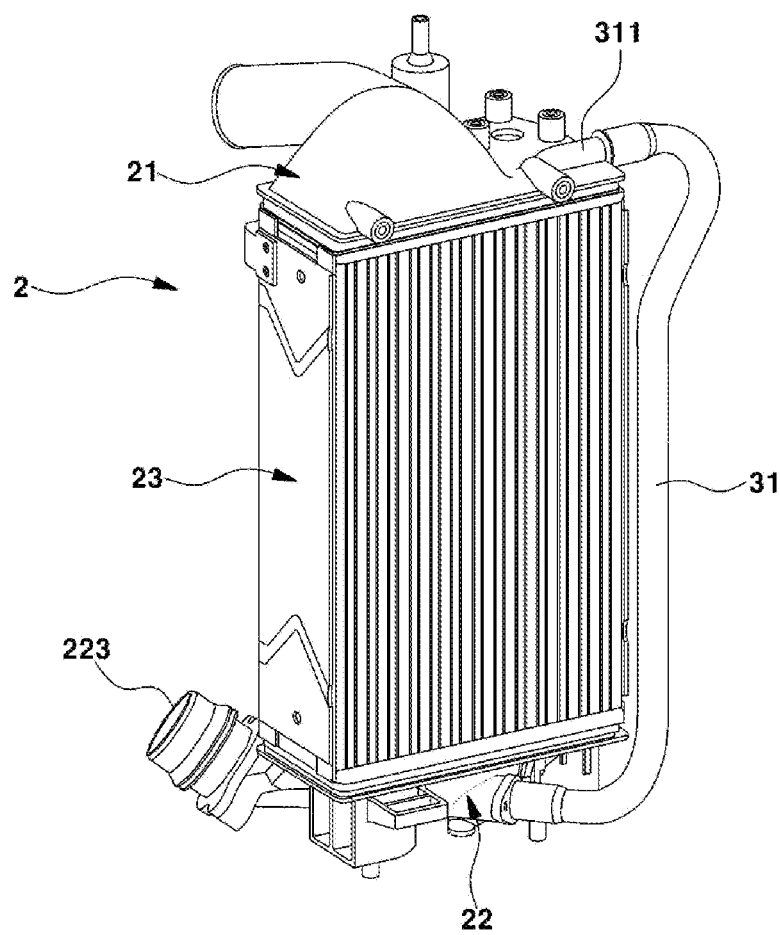
FIGS. 2A and 2B are diagrams illustrating a condensate discharge device of an intercooler according to an exemplary embodiment of the present disclosure.

The intercooler 2 may include, based on the flow direction of the air, an inlet tank 21 disposed on a front end portion of the intercooler 2, an outlet tank 22 disposed on a rear end portion of the intercooler 2, and a cooler core 23 disposed between the inlet tank 21 and the outlet tank 22 (see FIG. 2A). Air introduced from the atmosphere and a gas recovered from an engine exhaust system may be introduced into the inlet tank 21.

Particularly, fluids such as the air and the gas, which are introduced into the inlet tank 21, will be collectively referred to as "air." The air may be compressed by the compressor 121 to be supplied to the inlet tank 21. The compressor 121 may be installed on an upstream of the inlet tank 21 based on a flow direction of the air. When the turbine 122 of the turbocharger 12 is driven due to energy of the exhaust gas discharged from the engine 1, the compressor 121 may be driven with the turbine 122 to compress the air. The inlet tank 21 may be installed ahead or in front of the cooler core 23, and the air introduced into the inlet tank 21 may pass through the cooler core 23 to flow to the outlet tank 22.

The cooler core 23 may be configured to cool the air passing through an interior of the cooler core 23 by a cooling fluid which flows outside the cooler core 23. When the air passes through the cooler core 23, the air may be cooled through heat exchange with the cooling fluid. The cooler core 23 may be disposed between the inlet tank 21 and the outlet tank 22 and may be configured to cool the air introduced from the inlet tank 21 to discharge the cooled air to the outlet tank 22. The outlet tank 22 may be connected to the intake manifold 11 of the engine 1 to supply the air cooled in the cooler core 23 to the intake manifold 11. The outlet tank 22 may be disposed on an upstream of the intake manifold 11 which uniformly distributes the air to each cylinder of the engine 1.

Water (i.e., condensate), generated when the air is cooled in the cooler core 23 and thus moisture contained in the air is condensed, may be collected in the outlet tank 22. When the condensate collected in the outlet tank 22 is accumulated and thus a substantial amount of condensate stagnates, a failure of the engine 1 and malfunction of peripheral sensors may occur. According to the present disclosure, to solve the above-described problems which occur due to the collection of the substantial amount of condensate in the outlet tank 22, a condensate discharge device for discharging condensate from an interior to an exterior of the outlet tank 22 is provided.

Figure 2B:
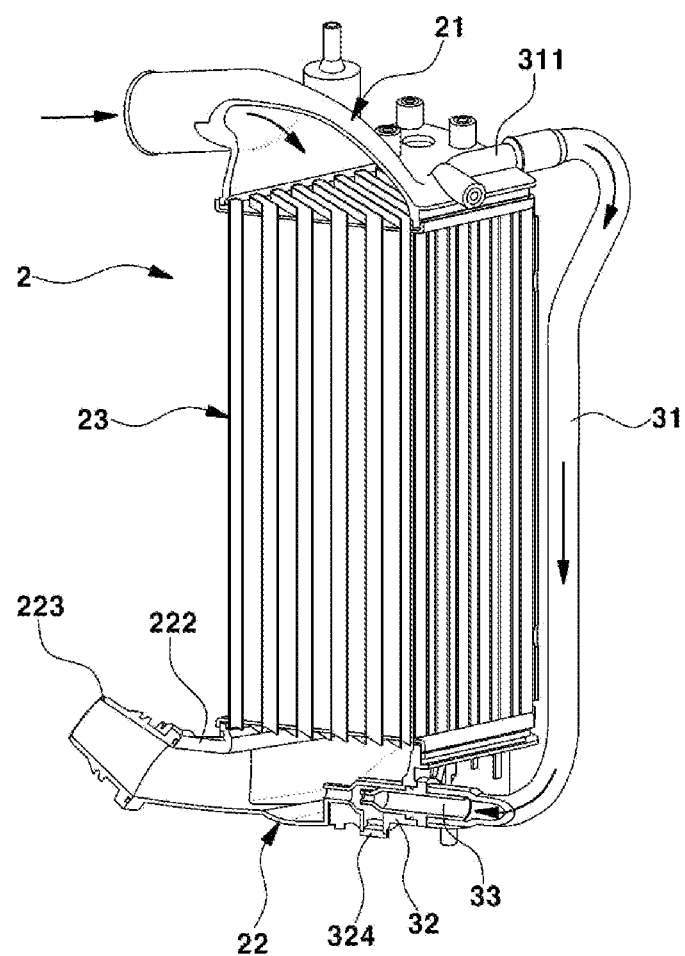

As shown in FIGS. 2A and 2B, the condensate discharge device may be configured to discharge the condensate collected in the outlet tank 22 to the outside thereof by injecting the air, which is introduced from the inlet tank 21, into an interior of the outlet tank 22 at a high pressure. In other words, the condensate discharge device may be configured to discharge the condensate collected in the outlet tank 22 to the outside of the outlet tank 22 using the high-temperature and high-pressure air introduced into the inlet tank 21. The condensate may be discharged to the outside of the outlet tank 22 in small amounts to be introduced into the engine 1 through the intake manifold 11.

The condensate discharge device is a type of ejector configured to discharge the condensate collected in the outlet tank 22 to the intake manifold 11. The condensate discharge device may include an ejector hose 31, an ejector housing 32, and an ejector nozzle 33. The ejector hose 31 may be installed between the inlet tank 21 and the outlet tank 22 to be disposed outside the cooler core 23. The ejector hose 31 provides a flow path for a flow of air between the inlet tank 21 and the outlet tank 22. The flow path is an inner space of the ejector hose 31 and may be an independent flow path from the cooler core 23. The air introduced from the inlet tank 21 to the outlet tank 22 through the flow path is not cooled by the cooler core 23. The air passing through the flow path and discharged to the outlet tank 22 may maintain a temperature that is substantially equal to that of the air introduced into the inlet tank 21.

Figure 3:
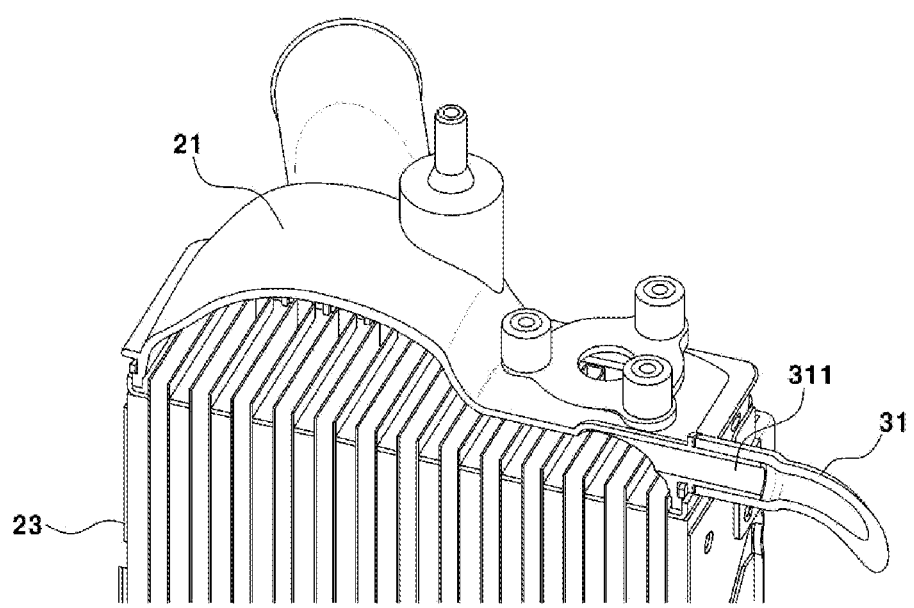
FIG. 3 is a diagram illustrating an inlet tank according to an exemplary embodiment of the present disclosure.

A front end portion of the ejector hose 31 may be connected to the inlet tank 21, and a rear end portion thereof may be connected to the outlet tank 22. A connection pipe 311 may be disposed within the inlet tank 21, and the connection pipe 311 may be connected to the front end portion of the ejector hose 31 (see FIG. 3). In other words, the air in the inlet tank 21 may be introduced into the ejector hose 31 through the connection pipe 311. The connection pipe 311 may discharge the air, which is introduced into the inlet tank 21, to the ejector hose 31.

According to the Bernoulli principle, a pressure of the air introduced from the inlet tank 21 into the ejector hose 31 decreases and a flow speed thereof increases. The flow speed of the air introduced into the ejector hose 31 may be equal to or greater than a predetermined speed. The rear end portion of the ejector hose 31 may be connected to a front end portion of the ejector nozzle 33, and the air introduced into the ejector hose 31 may be supplied to the ejector nozzle 33.

Figure 4:
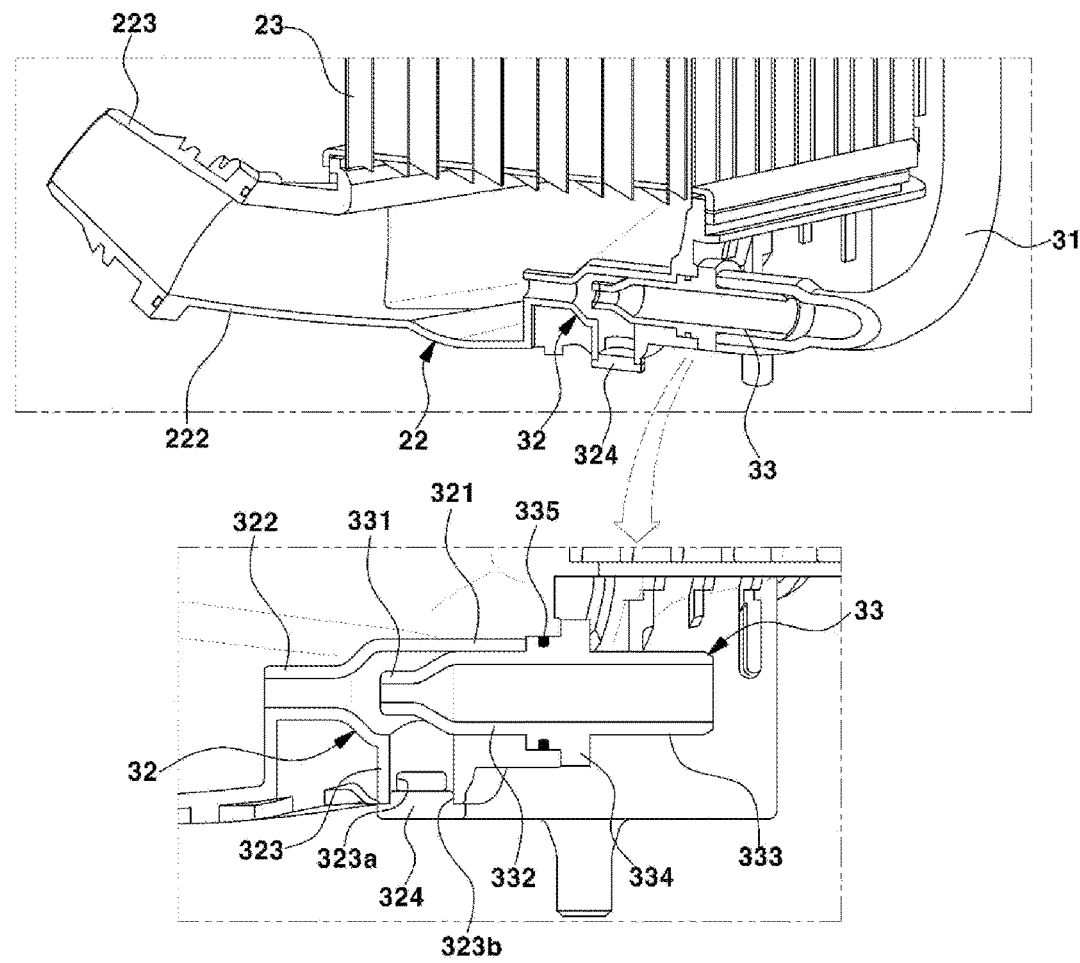
FIG. 4 is a diagram illustrating an ejector housing disposed in an outlet tank according to an exemplary embodiment of the present disclosure.

As shown in FIG. 4, the ejector housing 32 may be integrally formed to be disposed on one side of the outlet tank 22, and alternatively, the ejector housing 32 may be formed to allow the ejector nozzle 33 to be inserted thereinto, thereby being disposed on one side (e.g., a first side) of the outlet tank 22. To allow the condensate collected in the outlet tank 22 to be introduced into the ejector housing 32, the ejector housing 32 may be disposed on a bottom portion of the outlet tank 22. The ejector housing 32 may be disposed on the bottom portion of the outlet tank 22 at an edge thereof. In particular, the ejector housing 32 may be disposed to protrude inward the outlet tank 22 on the bottom portion thereof.

The ejector housing 32 may include a nozzle insertion portion 321, a condensate injection portion 322, and a condensate inlet 323. The nozzle insertion portion 321 may support the ejector nozzle 33 and may include an inner space into which a rear end portion of the ejector nozzle 33 may be inserted. A rear end portion of the nozzle insertion portion 321 may be open to allow the rear end portion of the ejector nozzle 33 to be inserted thereinto. In particular, the rear end portion of the nozzle insertion portion 321 may be disposed to protrude outward from the outlet tank 22.

The condensate injection portion 322 may be disposed behind the nozzle insertion portion 321 to operate as a nozzle of the ejector housing 32. In other words, the condensate injection portion 322 may be configured to discharge the air injected from the ejector nozzle 33 and the condensate introduced into an inner space of the ejector housing 32 through the condensate inlet 323 to an inner space of the outlet tank 22. The condensate injection portion 322 may be formed to be gradually narrow from the nozzle insertion portion 321. A minimum inner diameter of the condensate injection portion 322 may be less than an inner diameter of the nozzle insertion portion 321 by a predetermined value or more. Specifically, a front end portion of the condensate injection portion 322 may be formed to be tapered from a rear end portion of the nozzle insertion portion 321. An inner diameter of a rear end portion of the condensate injection portion 322 may be less than the diameter of the nozzle insertion portion 321 by a predetermined value or more.

The condensate inlet 323 may be disposed on the rear end portion of the nozzle insertion portion 321 to protrude outward from the nozzle insertion portion 321. The condensate inlet 323 may be disposed perpendicular to the flow direction of the air passing through the nozzle insertion portion 321 by the ejector nozzle 33. The condensate inlet 323 may be formed in a hollow pipe structure. The condensate suctioned into the condensate inlet 323 may be introduced into the condensate injection portion 322 through the rear end portion of the nozzle insertion portion 321.

Figure 5:
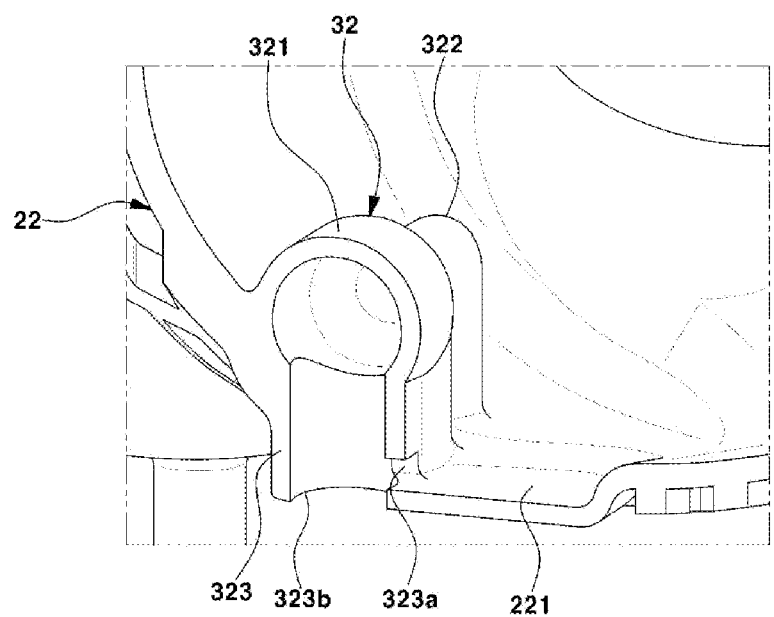
FIG. 5 is a diagram illustrating a condensate collection portion and a condensate inlet aperture according to an exemplary embodiment of the present disclosure.

Further, the condensate inlet 323 may be disposed to protrude from the bottom portion of the outlet tank 22 to the inner space thereof. As shown in FIG. 5, the condensate inlet 323 may include a condensate inlet aperture 323a through which the condensate collected in the outlet tank 22 may pass. The condensate inlet aperture 323a may be disposed on a front end portion of the condensate inlet 323. In addition, the condensate inlet aperture 323a may be disposed opposite a rear end portion of the condensate inlet 323 adjacent to the nozzle insertion portion 321. The condensate inlet aperture 323a may connect the inner space of the ejector housing 32 to the inner space of the outlet tank 22. In other words, the condensate inlet aperture 323a may connect an inner space of the condensate inlet 323 to the inner space of the outlet tank 22. The condensate collected in the inner space of the outlet tank 22 may be introduced into the condensate inlet 323 by passing through the front end portion of the condensate inlet 323 through the condensate inlet aperture 323a.

The outlet tank 22 may include a condensate collection portion 221 disposed on the bottom portion of the outlet tank 22. The condensate collection portion 221 may be disposed adjacent to an outer surface of the condensate inlet 323. Specifically, the condensate collection portion 221 may be disposed adjacent to the condensate inlet aperture 323a. The condensate collection portion 221 may be formed to allow the condensate collected in the outlet tank 22 to stagnate. In particular, the condensate collection portion 221 may be formed to be recessed in the bottom portion of the outlet tank 22 with a predetermined depth.

To integrally form the condensate inlet 323 having the condensate inlet 323a with the outlet tank 22, i.e., to secure formability of the condensate inlet 323 when the condensate inlet 323 is formed using a mold for forming the outlet tank 22, a final end (i.e., an opening 323b) of the condensate inlet 323 may be open to the outside of the outlet tank 22. An ejector cap 324 may be installed on the final end (e.g., opening 323b) of the condensate inlet 323 to seal the opening 323b of the condensate inlet 323. In other words, the ejector cap 324 may be installed on the opening 323b of the condensate inlet 323 which is disposed on a side opposite the nozzle insertion portion 321.

Figure 6:
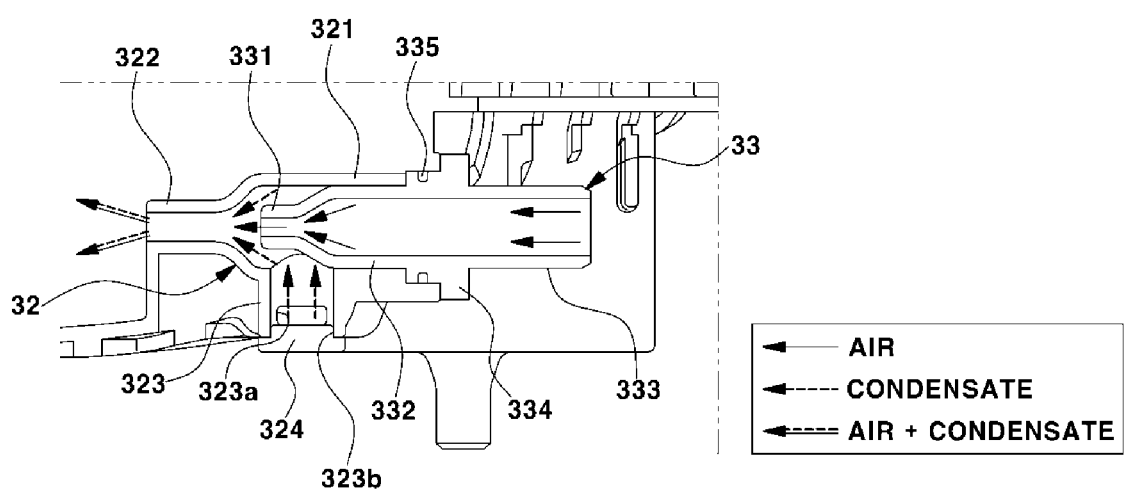
FIG. 6 is a diagram illustrating flows of air and condensate injected into the outlet tank according to an exemplary embodiment of the present disclosure.

The ejector nozzle 33 may be connected to the rear end portion of the ejector hose 31 to allow the air to be introduced from the ejector hose 31. The front end portion of the ejector nozzle 33 may be installed by being inserted into the rear end portion of the ejector hose 31. The ejector nozzle 33 may allow the air introduced through the ejector hose 31 to pass through the inner space of the ejector housing 32, thereby injecting the air into the inner space of the outlet tank 22. When the air is injected from the ejector nozzle 33, the condensate of the outlet tank 22 may be introduced into the inner space of the condensate inlet 323 through the condensate inlet aperture 323a. The condensate introduced into the condensate inlet 323 may be injected into the inner space of the outlet tank 22 together with the air injected from the ejector nozzle 33 (see FIG. 6). In other words, when the air is injected from the ejector nozzle 33, the ejector nozzle 33 may inject the condensate, which is introduced into the ejector housing 32, into the inner space of the outlet tank 22 together with the air.

The condensate suctioned into the condensate inlet 323 may be introduced into a space between the nozzle insertion portion 321 disposed ahead of the condensate injection portion 322 and the ejector nozzle 33 disposed inside the nozzle insertion portion 321 and then introduced into the condensate injection portion 322 together with the air injected from the ejector nozzle 33. Then, a flow speed of the condensate may increase in the condensate injection portion 322 and the condensate may be injected into the inner space of the outlet tank 22. When the air and the condensate are injected from the condensate injection portion 322 toward the inner space of the outlet tank 22, the air and the condensate may be mixed and atomized.

An air injection portion 331 may be disposed on the rear end portion of the ejector nozzle 33. The air injection portion 331 may be configured to discharge the air introduced from the ejector hose 31 toward the condensate injection portion 322 of the ejector housing 32. The air injection portion 331 may be disposed ahead or in front of the condensate injection portion 322 based on a direction in which the condensate is introduced into the condensate injection portion 322 and a direction in which the air is injected into the air injection portion 331. The air injection portion 331 and the condensate inlet 323 may be disposed on a straight line (e.g., adjacently).

The air injection portion 331 may be formed to be gradually narrowed from the front end portion of the ejector nozzle 33. A minimum inner diameter of the air injection portion 331 may be less than an inner diameter of the front end portion of the ejector nozzle 33 by a predetermined value or more. A front end portion of the air injection portion 331 may be formed to be tapered from the front end portion of the ejector nozzle 33. An inner diameter of a rear end portion of the air injection portion 331 may be less than the inner diameter of the front end portion of the ejector nozzle 33 by a predetermined value or more.

As an inner cross-sectional area of the ejector nozzle 33 gradually decreases in the air injection portion 331, the flow speed of the air injected from the air injection portion 331 toward the condensate injection portion 322 may increase. Since the air may be injected toward the condensate injection portion 322 at a flow speed that is equal to or greater than a predetermined speed, an internal pressure of the ejector housing 32 decreases and thus, the condensate accumulated in the condensate collection portion 221 may be suctioned into the ejector housing 32 through the condensate inlet aperture 323a.

Further, a flange 334 may be disposed on an outer surface of the ejector nozzle 33. When the rear end portion of the ejector nozzle 33 is installed by being inserted into the nozzle insertion portion 321 of the ejector housing 32, the flange 334 may guide and restrict an insertion position of the ejector nozzle 33 by being hooked to the outer surface of the ejector housing 32. The ejector nozzle 33 may be divided into, based on the flange 334, a hose connection portion 333 disposed on the front end portion of the ejector nozzle 33 and a housing insertion portion 332 disposed on the rear end portion of the ejector nozzle 33. The air injection portion 331 may be disposed on a rear side portion of the air injection portion 331.

In addition, an O-ring 335 may be disposed on the outer surface of the ejector nozzle 33. The O-ring 335 may be brought into close contact with (e.g., abutting contact) the outer surface of the ejector nozzle 33 and an inner surface of the nozzle insertion portion 321 to prevent the air from leaking between the outer surface of the ejector nozzle 33 and the inner surface of the nozzle insertion portion 321.

Meanwhile, the outlet tank 22 may include a discharge portion 222 for discharging the air cooled in the cooler core 23 to the outside of the outlet tank 22. The discharge portion 222 may be connected to a front end portion of the intake manifold 11 through a connection pipe 223. The discharge portion 222 may be disposed behind the ejector housing 32 based on a flow direction of the condensate discharged from the condensate injection portion 322 of the ejector housing 32. The discharge portion 222, the ejector housing 32, and the ejector nozzle 33 may be disposed on a straight line. Further, the discharge portion 222, the condensate injection portion 322 of the ejector housing 32, and the air injection portion 331 of the ejector nozzle 33 may be disposed on the same line.

The discharge portion 222 may be formed in a hollow pipe structure. The condensate discharged to the intake manifold 11 through the discharge portion 222 may be distributed to each cylinder of the engine 1 together with the air cooled in the cooler core 23. The condensate may be evaporated due to high-temperature air in the cylinder. According to the condensate discharge device configured as described above of the present disclosure, the condensate generated when the air introduced into the intercooler 2 is cooled in the cooler core 23 and then collected in the outlet tank 22 may be discharged from the outlet tank 22 in small amounts. Consequently, it may be possible to prevent the engine from being damaged due to a substantial amount of condensate which is collected in the outlet tank 22 to be excessively introduced into the combustion chamber of the engine temporarily.

Additionally, the condensate discharge device may prevent malfunction of various sensors disposed in the vicinity of the outlet tank 22 due to the condensate accumulated in the outlet tank 22, which is introduced into the sensors and then frozen. Further, when the condensate is continuously collected in the outlet tank 22, components of the condensate may be concentrated as collection and evaporation of the condensate are repeated. Acidity of the concentrated condensate may increase and thus, the concentrated condensate has strong acidity causing acceleration of corrosion of parts disposed in the vicinity of the outlet tank 22 and the outlet tank 22.

According to the condensate discharge device, the condensate collected in the outlet tank 22 may be discharged frequently therefrom to prevent acidity of the condensate from being increased and decelerate acceleration of the corrosion of the parts. Therefore, in accordance with the condensate discharge device according to the present disclosure, condensate collected in an outlet tank of an intercooler may be discharged from the outlet tank in small amounts to prevent an engine from being damaged due to a large amount of condensate which is collected in the outlet tank to be excessively introduced into a combustion chamber of the engine temporarily. Further, the condensate discharge device may prevent malfunction of sensors disposed in the vicinity of the outlet tank due to the condensate accumulated in the outlet tank, which is introduced into the sensors and then frozen.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. A condensate discharge device of an intercooler for a vehicle, including a cooler core disposed between an inlet tank and an outlet tank and configured to cool air introduced from the inlet tank and discharge the cooled air to the outlet tank, the condensate discharge device comprising:
   an ejector hose disposed between the inlet tank and the outlet tank to form a flow path for an air flow between the inlet tank and the outlet tank;
   an ejector housing disposed on one side of the outlet tank, wherein condensate collected in the outlet tank is introduced into the ejector housing; and
   an ejector nozzle disposed in the ejector housing and configured to inject air introduced from the ejector hose into an inner space of the outlet tank, and when injecting the air introduced from the ejector hose, to inject the condensate, which is introduced from the outlet tank into the ejector housing, injecting the inner space of the outlet tank with the air,
   wherein the ejector housing includes a nozzle insertion portion into which a rear end portion of the ejector nozzle is inserted,
   wherein a rear end portion of the ejector hose is connected to a front end portion of the ejector nozzle, and
   wherein the nozzle insertion portion of the ejector housing, the rear end portion of the ejector nozzle, the rear end portion of the ejector hose, and the front end portion of the ejector nozzle are concentrically disposed with one another.

2. The condensate discharge device of claim 1, wherein:
   the ejector housing includes a condensate inlet aperture for connecting an inner space of the ejector housing to the inner space of the outlet tank; and
   the condensate collected in the outlet tank is introduced from the outlet tank into the ejector housing through the condensate inlet aperture.

3. The condensate discharge device of claim 2, wherein the ejector housing further includes:
   a condensate injection portion disposed behind the nozzle insertion portion and configured to discharge the air injected from the ejector nozzle and the condensate introduced into the ejector housing to the inner space of the outlet tank; and
   a condensate inlet disposed on a rear end portion of the nozzle insertion portion and protruding outward the nozzle insertion portion,
   wherein the condensate inlet aperture is disposed on a front end portion of the condensate inlet.

4. The condensate discharge device of claim 3, wherein an inner diameter of the condensate injection portion is less than an inner diameter of the nozzle insertion portion.

5. The condensate discharge device of claim 3, wherein:
   the condensate inlet is disposed on a bottom portion of the outlet tank; and
   a condensate collection portion in which the condensate is collected is disposed on the bottom portion of the outlet tank,
   wherein the condensate collection portion is disposed adjacent to the condensate inlet aperture.

6. The condensate discharge device of claim 3, further comprising:
   an air injection portion configured to discharge the air introduced from the ejector hose toward the condensate injection portion and disposed on the rear end portion of the ejector nozzle,
   wherein the air injection portion is disposed in front of the condensate injection portion.

7. The condensate discharge device of claim 6, wherein the air injection portion and the condensate inlet are disposed linearly.

8. The condensate discharge device of claim 6, wherein an inner diameter of the air injection portion is less than an inner diameter of a front end portion of the ejector nozzle.

9. The condensate discharge device of claim 3, wherein the outlet tank includes a discharge portion connected to a front end portion of an intake manifold and the discharge portion is disposed behind the ejector housing based on a flow direction of the condensate discharged from the condensate injection portion of the ejector housing.

10. The condensate discharge device of claim 3, wherein a flange is disposed on an outer surface of the ejector nozzle and when the rear end portion of the ejector nozzle is inserted into the nozzle insertion portion of the ejector housing, the flange guides an insertion position of the ejector nozzle by being hooked to the outer surface of the ejector housing.

11. The condensate discharge device of claim 3, wherein an O-ring is disposed on an outer surface of the ejector nozzle; and the O-ring is brought into abutting contact with the outer surface of the ejector nozzle and an inner surface of the nozzle insertion portion to prevent the air introduced from the ejector hose from leaking between the outer surface of the ejector nozzle and the inner surface of the nozzle insertion portion.

12. The condensate discharge device of claim 3, wherein an opening is disposed at a final end of the condensate inlet and an ejector cap is installed on the opening to seal the final end of the condensate inlet.

13. The condensate discharge device of claim 1, wherein the ejector hose is disposed outside the cooler core.

14. The condensate discharge device of claim 1, wherein the inlet tank is disposed behind a compressor of a turbocharger driven by an exhaust gas discharged from an engine, and air compressed by the compressor is introduced into the inlet tank.

* * * * *